United States Patent [19]
Mumola

[11] Patent Number: 5,543,919
[45] Date of Patent: Aug. 6, 1996

[54] APPARATUS AND METHOD FOR PERFORMING HIGH SPATIAL RESOLUTION THIN FILM LAYER THICKNESS METROLOGY

[75] Inventor: Peter B. Mumola, Huntington, Conn.

[73] Assignee: Integrated Process Equipment Corp., Phoenix, Ariz.

[21] Appl. No.: 309,516

[22] Filed: Sep. 20, 1994

Related U.S. Application Data

[63] Continuation of Ser. No. 64,316, May 14, 1993, abandoned.

[51] Int. Cl.$^6$ .................................................. G01B 11/06
[52] U.S. Cl. ................................. 356/382; 356/357
[58] Field of Search .................................... 356/381, 382, 356/355, 357, 445, 448, 346; 250/560

[56] References Cited

U.S. PATENT DOCUMENTS

| | | | |
|---|---|---|---|
| 3,869,211 | 3/1975 | Watanabe et al. | 356/381 |
| 5,042,949 | 8/1991 | Greenberg et al. | 356/382 |
| 5,101,111 | 3/1992 | Kondo | 356/382 |
| 5,291,269 | 3/1994 | Ledger | 356/357 |
| 5,293,214 | 3/1994 | Ledger | 356/355 |
| 5,333,049 | 7/1994 | Ledger | 356/355 |
| 5,337,150 | 8/1994 | Mumola | 356/357 |

FOREIGN PATENT DOCUMENTS

| | | |
|---|---|---|
| 0293177 | 11/1988 | European Pat. Off. . |
| 0118603 | 5/1988 | Japan ................................ 356/381 |
| 2016678 | 9/1979 | United Kingdom . |
| WO-9011487 | 10/1990 | WIPO . |

*Primary Examiner*—Hoa Q. Pham
*Attorney, Agent, or Firm*—Cahill, Sutton & Thomas P.L.C.

[57] ABSTRACT

An apparatus (2) that performs high resolution thickness metrology on a thin film layer of a wafer (24), includes a filtered white light source that forms a collimated monochromatic light beam (19). The filtered white light source includes a halogen lamp (10), a condensing lens (12), a circular aperture (14), a collimator lens (16), and a narrow band filter wheel (18). The collimated monochromatic light beam (19) is passed through a beamsplitter (60), a second collimator lens (20), a third collimator lens (22), and a lenslet array (38), such that a corresponding array of sample points (39) on the surface of the wafer (24) are irradiated with focused monochromatic light. A reflectance pattern is formed at each sample point (39) due to coherent interactions in the monochromatic light as it is reflected within the wafer structure (24). An image of each reflectance pattern is reflected off the surface of the wafer (24) and is directed onto a detector array (31) of a charge coupled device (CCD) camera (30). Each reflectance pattern image is displayed on the CCD camera detector array (31) and captured by the CCD camera (30). Each captured image is digitized by a digitizing circuit (34) and stored by a computer (36). The computer (36) then compares this measured reflectance data to reference reflectance data already stored so as to determine the thickness of the thin film layer at each sample point (39) on the wafer (24).

20 Claims, 4 Drawing Sheets

5,543,919

APPARATUS AND METHOD FOR PERFORMING HIGH SPATIAL RESOLUTION THIN FILM LAYER THICKNESS METROLOGY

This is a continuation application Ser. No. 08/064,316, filed May 14, 1993, now abandoned.

BACKGROUND OF THE INVENTION

The present invention generally relates to an apparatus and method for performing thin film layer thickness metrology and, in particular, to an apparatus for performing high resolution thin film layer thickness metrology including means for irradiating a surface of a layer of material with an array of focused monochromatic radiation.

One application wherein the present invention is especially practical, is in conjunction with measurements of silicon-on-insulator (SOI) semiconductor wafers. Typically, an SOI wafer consists of an Si/SiO$_2$/Si sandwich structure, and is fabricated by growing a silicon dioxide (SiO$_2$) film on one surface of each of two silicon (Si) wafers and bonding the two silicon dioxide film surfaces together and annealing at high temperature. An outer surface of one of the two silicon wafers in the sandwich structure is then mechanically ground and polished to an average thickness of several microns. Unfortunately, this mechanical grinding and polishing results in large spatial variations in the thickness of this outer silicon layer. To reduce such spatial variations, a thickness error map indicating thickness non-uniformities in this outer silicon layer over its entire surface is required, for example, to initialize a micropolishing process.

One particular apparatus and method of obtaining such a thickness error map is described in U.S. patent application Ser. No. 07/804,872, filed on Dec. 6, 1991, entitled, Apparatus and Method for Measuring the Thickness of Thin Films, and assigned to the assignee hereof. The above-identified application is hereby incorporated herein by reference. Therein, thickness non-uniformities in the outer silicon layer are obtained by measuring reflectance characteristics over a full aperture of the outer silicon layer surface and then comparing this measured reflectance data to reference reflectance data by using numerical iteration or by using a calibration wafer having known outer silicon layer thicknesses. The reflectance characteristics are measured by projecting collimated monochromatic light onto the entire outer silicon layer surface such that coherent interactions occur in the light as it is reflected at the physical boundaries of the sandwich structure. As a result of these coherent interactions, an interference fringe pattern is formed on the outer silicon layer surface, a reflected image of which is captured by a charge coupled device (CCD) camera. From the captured interference fringe pattern image a reflectance map of the outer silicon layer is generated, the map is compared to reference reflectance data to determine the thickness non-uniformities in the outer silicon layer.

The above-described technique for obtaining thickness non-uniformities in the outer silicon layer is generally sufficient when thickness non-uniformities on the order of 200 Å/mm or greater must be detected. Such is the case since the imaging system used in that apparatus typically provides a lateral spatial resolution on the order of only 400 µm, which is derived as follows.

Referring to FIG. 1, a schematic representation of the apparatus 1 used in the above-referenced patent application is shown. The resolution, d, is determined by the aperture, D, the focal length, f, of the imaging lens 64 in front of the CCD camera 30, and by the wavelength, λ, of the collimated monochromatic light 62 passing through the imaging lens 64. Typical values for these parameters are D≈5 mm, f≈1 m, and λ≈900 nm, and their relation to the resolution, d, is given by the following formula, $$d = 2.44 f \lambda / D$$

Applying the typical values to this formula, the corresponding typical value of the resolution is d≈400 µm.

Hence, the above-described apparatus and method of obtaining thickness non-uniformities in the outer silicon layer is generally not sufficient when thickness non-uniformities greater than 200 Å/mm are to be detected. The detection of such greater thickness non-uniformities is desirable not only with the outer silicon layer of the SOI wafer as described above, but also with semiconductor wafers in general whose outer layers have been lithographically patterned with integrated circuit designs. Such patterned wafers typically have thin film layer designs of circuit components that are smaller than 100 µm in width with very large thickness non-uniformities (or gradients) along their edges. The detection of these thickness non-uniformities would allow precise verification that the thin film layer designs have been correctly patterned, in both location and thickness, into the semiconductor wafers. Consequently, extensive monitoring and control of integrated circuit fabrication processes could achieved. It is therefore be desirable to perform thin film layer thickness metrology with a higher lateral spatial resolution than is presently achieved with the prior art.

SUMMARY OF THE INVENTION

The present invention contemplates an apparatus and method for performing high resolution thin film layer thickness metrology on, for example, a lithographically patterned thin film layer of a semiconductor wafer. Similar to the prior art, non-uniformities in the thickness of this thin film layer are obtained by measuring the reflectance characteristics of the semiconductor wafer, and by comparing this measured reflectance characteristics data to reference reflectance characteristics data by using numerical iteration or by using a calibration wafer having known thin film layer thicknesses. With the addition of a lenslet array, however, the present invention measures the reflectance characteristics at a corresponding array of sample points on the surface of the semiconductor wafer so as to detect thickness non-uniformities in the thin film layer with much higher resolution.

To measure the reflectance characteristics at an array of sample points on the semiconductor wafer surface, a filtered white light source is used to produce a series of monochromatic light beams, each operating at a different wavelength. These monochromatic light beams are sequentially projected along an optical imaging system, including a lenslet array for focusing the beams to a corresponding array of sample points on the surface of the semiconductor wafer. At each sample point, the light beams penetrate the wafer surface such that coherent interactions occur in the light as it is reflected between the physical boundaries of the wafer structure. As a result of these interactions, a reflectance pattern is formed at each sample point for each sequentially projected light beam, i.e. at each wavelength. A reflected image including all of the reflectance patterns in the array of sample points is then collected by the lenslet array for each light beam. The reflected images are projected back through the optical imaging system and onto, for example, a detector array of a charge coupled device (CCD) camera. The CCD camera captures each reflectance pattern image by digitizing pixels in the detector array that correspond to each image present thereon. A reflectance map is then generated from each captured reflectance pattern image.

Of course, the reflectance maps just described would only provide reflectance characteristics data for the array of sample points. However, by repeatedly performing the above-described reflectance characteristics measuring method such that the entire surface of the semiconductor wafer is sampled, a reflectance map of the entire surface of the semiconductor wafer may be obtained. It should be noted that several reflectance maps are typically generated to eliminate thickness ambiguities that can result from thin film layers having phase thicknesses greater than $2\pi$.

The reference reflectance characteristics data for a wafer can be obtained either by a theoretical calculation or through the use of a calibration wafer. The theoretical method consists of numerically computing reference reflectance characteristics based on assumed values for the intrinsic optical properties of the wafer materials. Alternatively, a calibration wafer, having a known thin film layer thickness profile, can be constructed from the same batch of materials used to construct the wafer to be measured. By subjecting this calibration wafer to the measuring method of the present invention, reference reflectance data is accurately obtained.

The comparison between the measured reflectance characteristics data and the reference reflectance characteristics data is performed by a computer. Upon performing this comparison, the computer provides a mapping of thin film layer thicknesses or a mapping of thin film layer thickness non-uniformities over the entire surface of the semiconductor wafer. Either way, the resolution of the mapping provided by the present invention is significantly higher than that of the prior art due to the focused sampling in the above-described reflectance characteristics measuring method.

From the above descriptive summary, it is thus apparent how the present invention high resolution thin film thickness measuring method overcomes the shortcomings of the above-described prior art method.

Accordingly, it is one objective of the present invention to provide an apparatus for performing high resolution thin film thickness metrology.

This object is achieved, at least in part, by an apparatus including means for irradiating a surface of a layer of material with an array of focused monochromatic radiation.

Other objectives and advantages of the present invention will become apparent to those skilled in the art from the following detailed description read in conjunction with the appended claims and the drawings attached hereto.

BRIEF DESCRIPTION OF THE DRAWINGS

The drawings not drawn to scale, include.

DETAILED DESCRIPTION OF THE INVENTION

Figure 1:
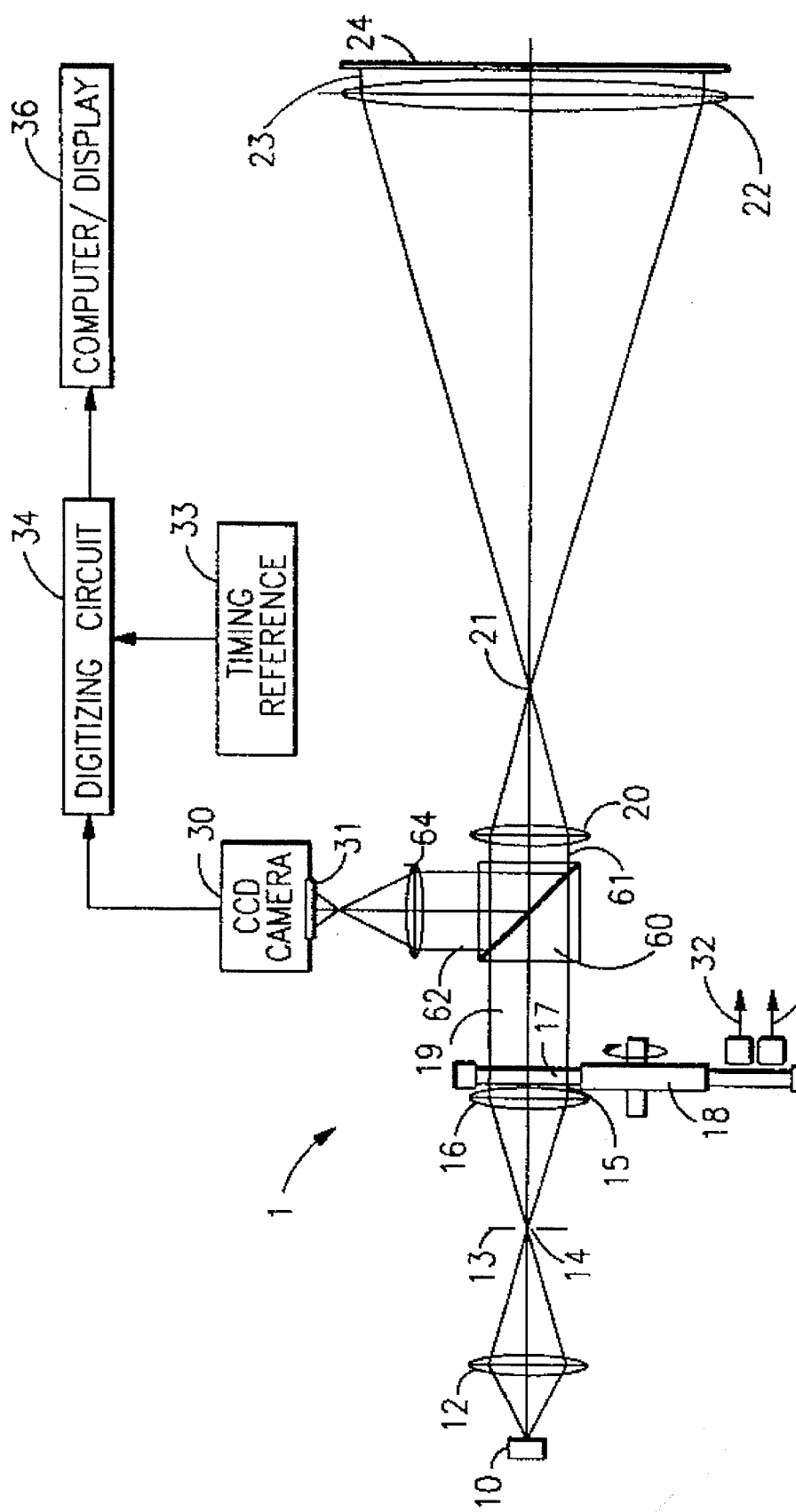
FIG. 1 is a schematic representation of a prior art thin film layer thickness measuring instrument.
Figure 2:
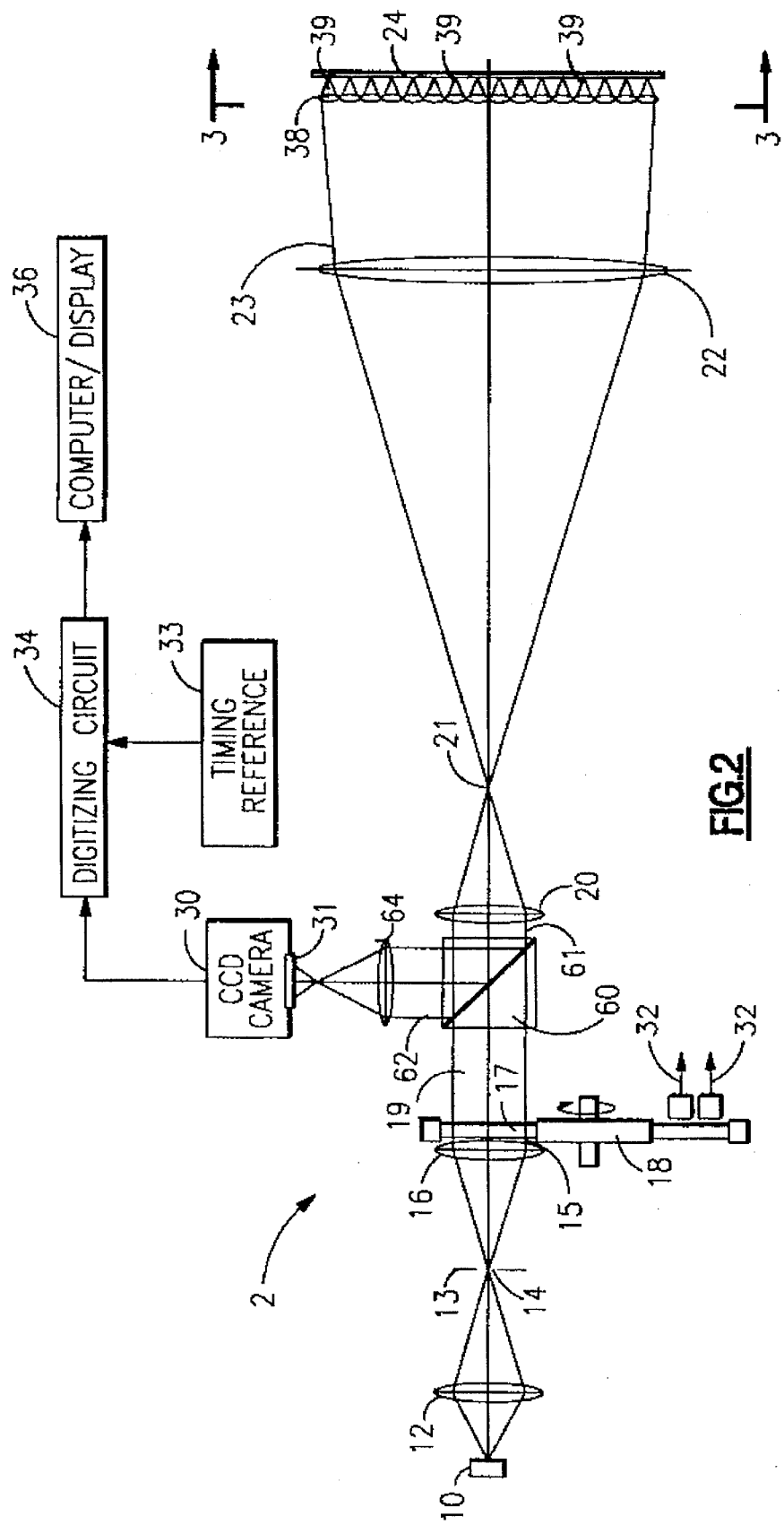
FIG. 2 is a schematic representation of an on-axis high resolution thin film layer thickness measuring instrument embodying the principles of the present invention.

Referring to FIG. 2, there is shown an apparatus 2 for measuring a thin film layer thickness of a patterned semiconductor wafer 24 at high resolution. For the purpose of this detailed description, the thickness measurement of a patterned outer silicon layer of an SOI semiconductor wafer 24 is described. It should be noted that the apparatus 2 shown in FIG. 2 is essentially identical to the apparatus 1 shown in FIG. 1, with the exception of a lenslet array 38 in the apparatus 2 of FIG. 2.

In one particular embodiment, the apparatus 2 provides a spatially filtered white light source that includes a plate 13 having a circular aperture 14 that is illuminated by a halogen lamp 10 through a condensing lens 12. Light passing through aperture 14 impinges on a collimator lens 16 to form a beam 15 of collimated light. The size of the aperture 14 determines the field angle in the collimated light sections of the apparatus 2, and the orientation of the aperture 14 is chosen to allow an aperture image to be projected toward the SOI wafer 24. It should be noted that the condensing lens 12 may be replaced by a fiber optic light guide.

The collimated beam 15 produced by the white light source and the collimator lens 16 is spectrally filtered, for example, by a series of narrow band filters 17, preferably of 30 to 50 Å half bandwidth. In this embodiment, the series of filters 17 are disposed around the periphery of a rotating filter wheel assembly 18 such that a corresponding series of collimated monochromatic light beams 19 are produced. The wavelengths of these collimated monochromatic light beams 19 typically range from 550 nm to 950 nm. Locating the filter wheel assembly 18 in the path of the collimated beam 15 minimizes the spectral broadening of the filtered beam 19 caused by the field angle defined by the size of the aperture 14. A pair of electronic signals 32 are generated by the filter wheel assembly 18 to serve as a timing reference 33 for a digitizing circuit 34. One of these signals indicates the beginning of a filter wheel revolution, whereas the other signal indicates the beginning of each filter period. Each of the collimated monochromatic light beams 19 is directed toward an on-axis beamsplitter 60 where a portion 61 of each collimated monochromatic light beam is transmitted toward a second collimator lens 20. It should be noted that a monochromator can replace the halogen lamp 10, the condensing lens 12, and the narrow band filter wheel 18, provided the slewing rate of the monochromator between different wavelengths is sufficiently high; up to twenty different wavelengths in less than one second.

Figure 3:
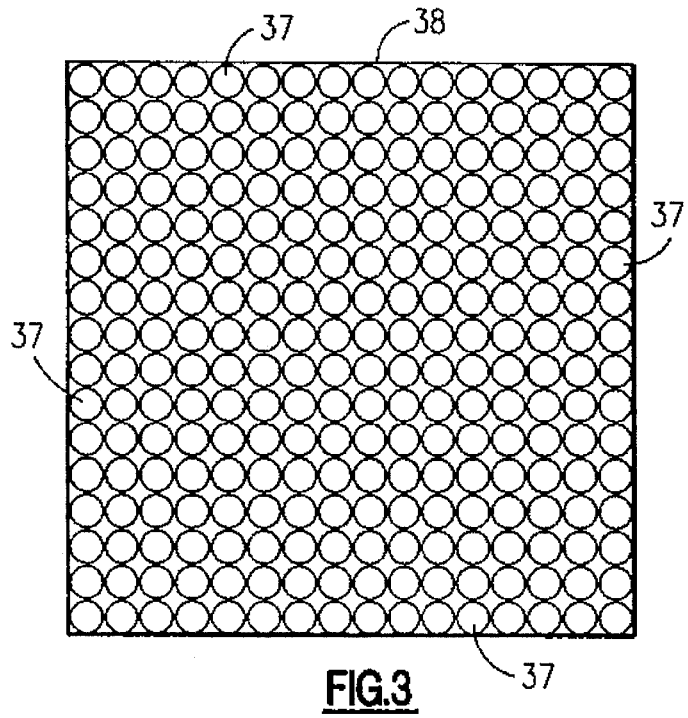
FIG. 3 is a front view of the lenslet array taken along line 3—3 of FIG. 2.

The second collimator lens 20 focuses the transmitted portion 61 of each collimated monochromatic light beam to a point 21 in the focal planes of both the second collimator lens 20 and a third collimator lens 22. This third collimator lens 22 produces a collimated beam 23 that is directed toward the lenslet array 38. The lenslet array 38 focuses the collimated beam 23 to a corresponding array of sample points 39 on the patterned SOI wafer 24. Referring to FIG. 3, a front view of the lenslet array 38 is shown containing a plurality of lenslets 37. It should be noted that although there are 256 lenslets 37 shown in the lenslet array 38 of FIG. 3, a much larger number of lenslets may be contained in a lenslet array, typically the number of lenslets is selected to correspond to the number of pixels in a CCD camera detector array 31, as discussed in more detail hereinafter.

Figure 4:
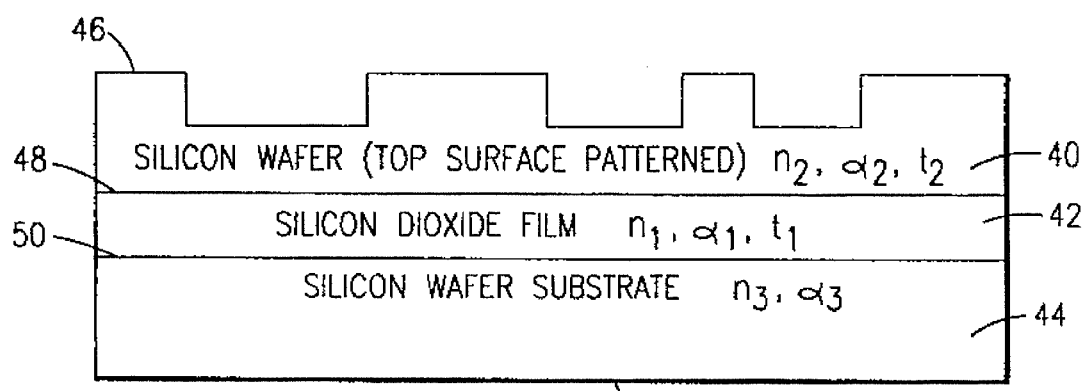
FIG. 4 is an enlarged illustration of the various layers of an SOI semiconductor wafer.

Referring to FIG. 4, an SOI semiconductor wafer 24 is shown constructed in a sandwich structure including, in this example, a lithographically patterned outer silicon layer 40, an internal silicon dioxide ($SiO_2$) film 42, and a silicon wafer substrate 44. This sandwich structure creates three interfaces 46, 48, 50 at which light, incident upon the outer silicon layer 40, is reflected. The reflectance characteristics of these interfaces 46, 48, 50 are based upon the intrinsic optical and physical properties of the materials in each layer 40, 42, 44 of the SOI wafer 24. These properties include the absorption coefficient ($\alpha$), the index of refraction (n), and the thickness (t) of the material layers 40, 42, 44. For an SOI wafer, it is assumed that the absorption coefficient, ($\alpha_1$), of the $SiO_2$ layer 42 is zero. However, in general, it is permissible that the absorption coefficient be non-zero, provided, however, that it is known.

When the SOI wafer 24 is installed in the apparatus 2 of FIG. 2 and the collimated monochromatic light 23 is focused to the array of sample points 39 on the surface 46 of the SOI wafer 24, a series of coherent interactions occur as this light is reflected between the three material interfaces 46, 48, 50 of the SOI wafer structure 24. These interactions produce wavelength dependent reflectance patterns that are displayed at each sample point 39 on the surface 46 of the SOI wafer 24. The design of each reflectance pattern, or the reflectance at each sample point 39, is determined by the multitude of reflections that occur between the three interfaces 46, 48, 50, and by the value of the physical properties ($n_1,\alpha_1,t_1,n_2,\alpha_2,t_2,n_3,\alpha_3$) of the material layers 40, 42, 44. In the case of an SOI wafer structure, the substrate indices ($n_3,\alpha_3$) are identical to those of the outer silicon layer indices ($n_2,\alpha_2$) since both are fabricated from single crystal silicon. Accordingly, the reflectance at any wavelength can be calculated explicitly as a function of the outer silicon layer thickness ($t_2$) if all the other physical properties are known. However, the reverse problem of computing the outer silicon layer thickness ($t_2$) from a single measured reflectance is ambiguous. This ambiguity is created by the fact that as the outer silicon layer thickness ($t_2$) is increased, the measured reflectance cycles between maximum and minimum values as the phase thickness ($n_2t_2$) increases by multiples of $\pi/4$. This multiple values problem clearly makes the computation of the value of $t_2$ from a single reflectance measurement ambiguous. Thus, reflectance measurements are made at multiple wavelengths. The use of multiple wavelength measurements can, in principle, overcome the multiple values problem, but the wavelength dependent behavior of the material properties must be accurately known or large errors can occur in the thickness computations.

An alternative approach for overcoming the multiple values problem is a statistical one, wherein measured reflectance data at several wavelengths is compared on a least squares best fit basis with a library of computed spectral data at the same wavelengths. In the case of an SOI wafer, the library of spectra is computed for all values of the outer silicon layer thickness and a thickness selection is made by choosing the outer silicon layer thickness which minimizes the least squares best fit.

Referring again to FIG. 2, an image comprised of all of the displayed reflectance patterns is reflected off the surface 46 of the SOI wafer 24 and returned through the lenslet array 38 and the third collimator lens 22. The third collimator lens 22 focuses the reflected image to the point 21 in the focal planes of both the third collimator lens 22 and the second collimator lens 20. The second collimator lens 20 collimates the reflected image and directs it toward the on-axis beamsplitter 60. The beamsplitter 60 redirects a portion 62 of the collimated image to a final collimator lens 64. This final collimator lens 64 focuses the redirected portion 62 of the collimated image onto a CCD camera detector array 31, where each wavelength dependent reflectance pattern image is sequentially displayed. It should be noted that the use of the beamsplitter 60 results in optical losses that are inherent in beamsplitters. It should also be noted that the filter wheel assembly 18 can alternatively be disposed in the collimated beam 62 redirected by the beamsplitter 60, instead of in the collimated beam 15 created by the collimator lens 16, provided that the field angle can be tolerated by the narrow band filters 17.

Figure 5:
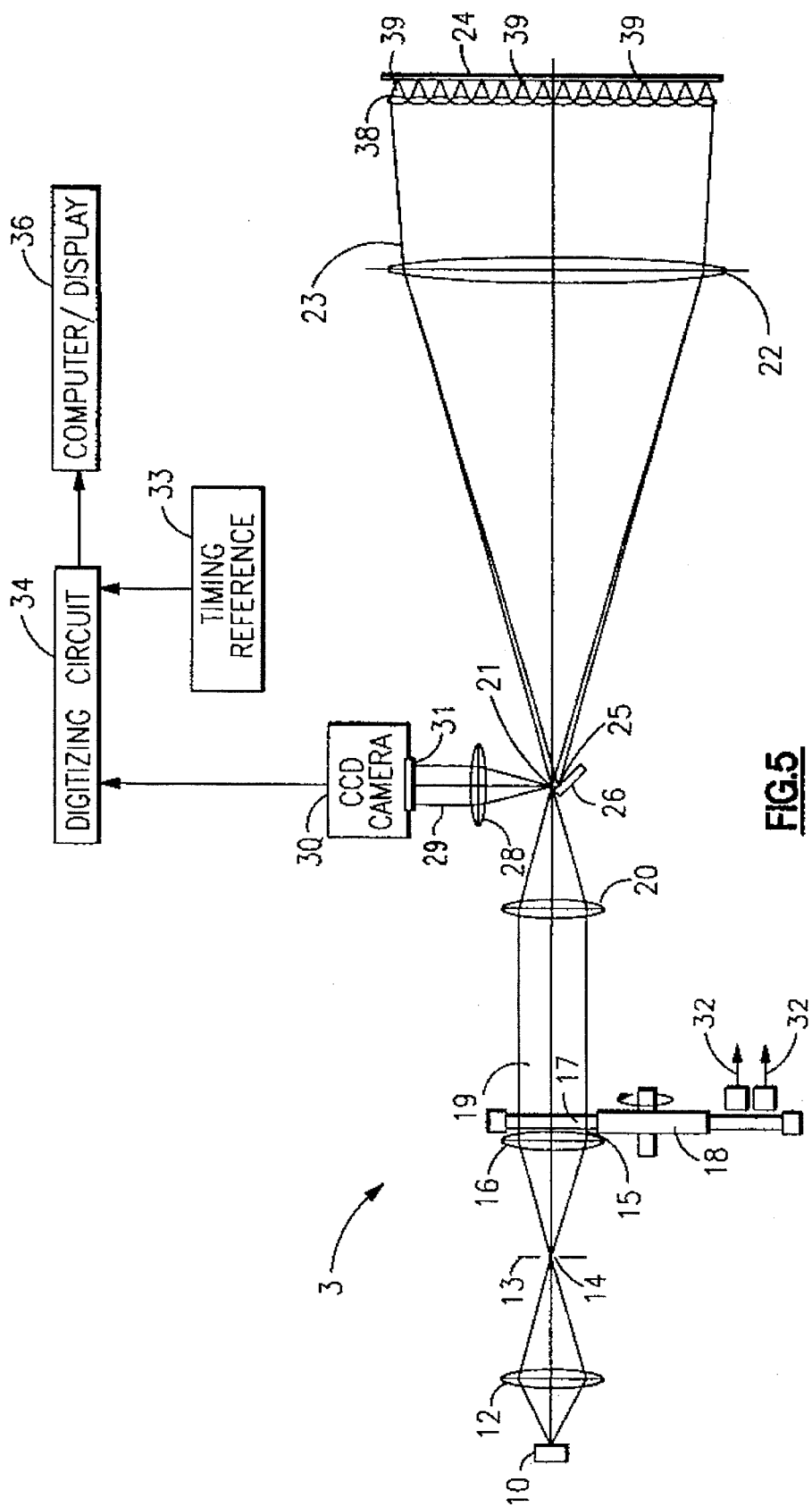
FIG. 5 is a schematic representation of an off-axis high resolution thin film layer thickness measuring instrument embodying the principles of the present invention.

An apparatus 3 for providing an alternate arrangement for displaying each wavelength dependent reflectance pattern image on the CCD camera detector array 31 is shown in FIG. 5. In this apparatus 3, the third collimator lens 22 is disposed to focus the reflected image of all the displayed reflectance patterns to an off-axis mirror 26. The mirror 26 is located at a point 25 in the focal plane of the third collimator lens 22, alongside the point 21 in the focal planes of both the third collimator lens 22 and the second collimator lens 20. The separation of these two focal points 21, 25 may be controlled with a slight lateral shift in the optical axis of the third collimator lens 22 with respect to the optical axes of the condensing lens 12 and the first two collimator lenses 16, 20. Equivalently, the lenslet array 38 may be tilted through a small angle, less than one degree, to achieve this same effect. It should be noted that the remaining components shown in FIG. 5 are identical to those shown in FIG. 2, and therefore are numerically identified as such.

The off-axis mirror 26 is used to redirect the reflected image to a final collimator lens 28. The final collimator lens 28 forms a collimated beam 29 that is directed toward the CCD camera detector array 31 where each wavelength dependent reflectance pattern image is then sequentially displayed. It should be noted that although this alternate method of displaying the reflectance pattern images on the CCD camera detector array 31 avoids the use of a beamsplitter with its inherent optical losses, field angle errors may result from the off-axis image separation configuration. It should also be noted that the filter wheel assembly 18 can alternatively be placed in the collimated beam 29 provided, as before, that the field angle can be tolerated by the narrow band filters 17.

The determination of the configuration used to display the wavelength dependent reflectance pattern images on the CCD camera detector array 31 is dependent upon the beam intensity that is required to maintain a suitably displayed wavelength dependent reflectance pattern image. The use of the on-axis beamsplitter method results in decreased beam intensity due to optical losses that are inherent to beamsplitters. The alternate off-axis mirror configuration eliminates the need for a beamsplitter, thereby improving the optical throughput by a factor of 4. Thus, if the wavelength dependent reflectance pattern image is not suitably displayed using the on-axis beamsplitter method, then the off-axis mirror configuration must be used.

Regardless of the configuration selected, the wavelength dependent reflectance pattern image that is displayed on the CCD camera detector array 31 is captured by the CCD camera 30. A reflectance map is generated by digitizing pixels in the CCD array 31 corresponding to each wavelength dependent reflectance pattern image that is displayed thereon through the use of a digitizing circuit 34. The thickness ($t_2$) of the outer silicon layer 40 of the SOI wafer 24, can be determined by either a numerical computation method or by use of an SOI calibration wafer. Both techniques typically require the use of a computer 36.

The numerical method of determining outer silicon layer thickness ($t_2$) includes assuming values for the thin film constants $n_1$, $\alpha_1$, $t_1$, $n_2$, $\alpha_2$, $n_3$, and $\alpha_3$, and calculating spectral reflectances for a set of wavelengths corresponding to the monochromatic light produced by the filtered white light source. This calculation is done for a number of different outer silicon layer thicknesses ($t_2$) and, provided that the initial thin film constant assumptions are correct, should only need to be computed once. This calculation provides sets of reflectance values, $R_c(\lambda_1, \lambda_2, \ldots \lambda_n, t_2)$, for thicknesses ranging from the thinnest to the thickest estimated value of the outer silicon layer. These computed spectral reflectances are then compared with the measured reflectance data, $R_m(\lambda_1, \lambda_2, \ldots \lambda_n, t_2)$, at specific points on the wafer using a root mean square (rms) merit function of the form, $$M(x, y, t_2) = \left[ \frac{1}{n\max} \left[ \sum_{n=1}^{n\max} [R_m(x, y, \lambda_n) - R_c(\lambda_n, t_2)]^2 \right] \right]^{1/2}$$

This merit function is evaluated for different values of $t_2$ until a minimum or best match is found, which in turn indicates the most likely thickness. Of course, other pattern matching merit functions can be used if desired.

Unknown variations in any of the assumed thin film constants may cause errors to propagate through the computation process as outer silicon layer thickness errors. Such first order error sources include the lack of knowledge of the thickness ($t_1$) of the SiO$_2$ layer 42 over the wafer aperture and the dispersive effects of the silicon index of refraction ($n_1$). If the value of the merit function is too large, indicating a poor match, then new computed spectral reflectances will have to be generated for a closer set of $t_2$ thicknesses, iterated with the absorption coefficients ($\alpha_2, \alpha_3$) arid the indices of refraction ($n_2, n_3$) Of the outer silicon layer 40 and the silicon substrate 44, respectively, or the index of refraction ($n_1$) and the thickness ($t_1$) of the SiO$_2$ layer 42.

Figure 6:
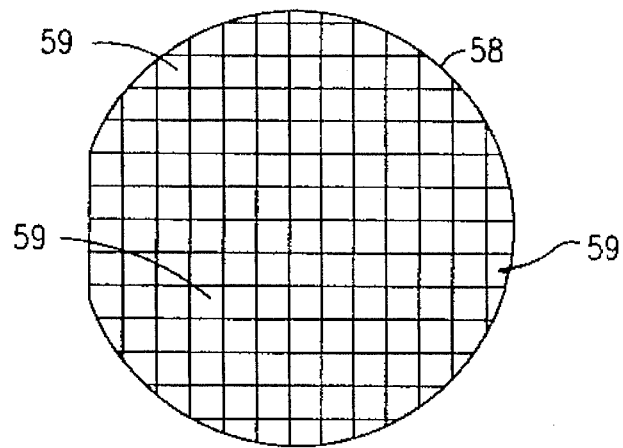
FIG. 6 is a plan view of an SOI semiconductor calibration wafer having a stepped outer silicon layer surface.

The second method of determining outer silicon layer thickness is to generate a set of spectral reflectances from an SOI calibration wafer 58 having a stepped outer surface, as shown in FIG. 6, wherein each square area 59 of the wafer has a different known outer silicon layer thickness. It is preferred that such a calibration wafer 58 have at least 500 reference squares to cover the likely range of outer silicon layer thicknesses. This wafer 58 can be calibrated for outer silicon layer thicknesses down to zero silicon thickness by using a stylus profilometer. The calibration wafer 58 is manufactured from the same batch of materials and is subject to the same manufacturing conditions as the wafer 24 under measurement. Consequently, the intrinsic optical properties of the calibration wafer such as the absorption coefficient and the index of refraction, and also the dispersive behavior, should match those of the wafer 24 being tested.

The spectral reflectances of the calibration wafer 58 are obtained by subjecting this wafer to the measuring method described herein. These spectral reflectances are stored in the computer 36 and are used as a reference for comparison with the spectral reflectance of a measured SOI wafer 24. The calibration wafer 58 has reference reflectances for at least 500 different outer silicon layer thicknesses and the reference reflectance that most closely matches the reflectance at any sample point 39 on the surface 46 of the measured SOI wafer 24 indicates the outer silicon layer thickness at that point.

Although both of these methods are sufficient for determining the thickness of the outer silicon layer 40 of the SIO wafer 24, the calibration wafer method is potentially more accurate than the numerical approach due to the similarity of the intrinsic optical properties between the calibration wafer 58 and the SOI wafer 24 to be measured. However, the calibration wafer method would require on-line production capability to generate a new calibration wafer 58 if the basic wafer process is significantly altered.

By following any of the above-described present invention methods thus far, the thickness of the outer silicon layer 40 of the SOI wafer 24 will only be known at the sample points 39. It is likely, however, that the thickness of the outer silicon layer 40 over the entire surface of the SOI wafer 24 would need to be known. To obtain such thickness data, either the measuring apparatus 2, 3 or the wafer 24 may be moved in a controlled manner such that the spectral reflectances of the entire wafer surface 46 may be measured. This measured reflectance data is then compared to the reference reflectance data, as described above, to determine the thickness of the outer silicon layer 40 over the entire surface of the SOI wafer 24.

With the preferred embodiments 2, 3 of the present invention now fully described, it can thus be seen that the primary objective set forth above is efficiently attained and that other arrangements and configurations can be made in the above-described embodiments without departing from the spirit and scope of the invention. The present invention is deemed limited only by the appended claims and the reasonable interpretation thereof.

What is claimed is:

1. An apparatus for performing high resolution thickness metrology on a layer of material formed on a semiconductor wafer, wherein said layer has a front and a rear surface, and wherein said material of said layer has a property that allows radiation to be transmitted therethrough, said apparatus comprising:

(a) a white light source (b) means for collimating said white light into a collimated beam;

(c) a plurality of narrow band filters for passing different wavelengths;

(d) means for sequentially placing said narrow band filters one at a time into said collimated beam to form a sequence of collimated monochromatic beams;

(e) lenslet array means for focusing said collimated monochromatic beam such that multiple sample points on a full aperture surface area of said front surface of said layer of material are irradiated in sequence with focused monochromatic light of differing wavelengths wherein said focused monochromatic radiation is reflected from said front and rear surfaces of said layer of material in interference fringe patterns at said multiple sample points and collected by said lenslet array and wherein said reflected monochromatic radiation from said multiple sample points has characteristics comprising said interference fringe reflectance patterns that correspond to the thickness of said layer of material;

(f) means for receiving said reflectance pattern from said reflected monochromatic radiation and for detecting said characteristics; and (g) means for comparing said detected characteristics of said received monochromatic radiation with a set of reference characteristics that correspond to known thicknesses and for providing an output that corresponds to the thickness of said layer of material at said multiple sample points.

2. The apparatus as defined in claim 1, wherein said lenslet array has at least one focusing lenslet.

3. The apparatus as defined in claim 1, wherein said means for sequentially placing said narrow band filters comprises a rotatable filter wheel assembly.

4. The apparatus as defined in claim 3, additionally comprising electronic sensors associated with said rotatable filter wheel assembly for providing electrical outputs indicative of each rotation of said filter wheel and a beginning of each narrow band filter period.

5. The apparatus as defined in claim 1, wherein said means for receiving said reflected radiation and for detecting said characteristics comprises a charge coupled device.

6. The apparatus as defined in claim 1, wherein said set of reference characteristics used in said means for comparing said detected characteristics is computed based on predetermined thicknesses and assumed optical properties of said material of said layer.

7. The apparatus as defined in claim 6, wherein said means for comparing includes a computer having said set of reference characteristics stored therein.

8. The apparatus as defined in claim 1, wherein said set of reference characteristics used in said means for comparing said detected characteristics is obtained by storing characteristics derived from a layer of material having a plurality of known thicknesses.

9. The apparatus as defined in claim 8, wherein said means for comparing comprises a computer having said set of reference characteristics stored therein.

10. The apparatus as defined in claim 1, wherein said layer of material is one of a plurality of other thin film layers formed on a substrate.

11. The apparatus as defined in claim 10, wherein said other thin film layers in said plurality have properties that allow radiation to be transmitted therethrough, wherein said substrate has a property that allows radiation to be reflected, and wherein said focused monochromatic radiation is reflected from said front and rear surfaces of said layer of material, from front and rear surfaces of said other thin film layers in said plurality, and from a front surface of said substrate.

12. The apparatus as defined in claim 11, wherein said material of said layer to be measured comprises silicon and said substrate comprises silicon.

13. The apparatus as defined in claim 1, wherein said means for receiving said reflected monochromatic radiation and for detecting said characteristics comprises:

a charge coupled device camera for detecting said characteristics from said reflected monochromatic radiation;

means for focusing said reflected monochromatic radiation onto said charge coupled device camera; and means for directing said reflected monochromatic radiation to said focusing means.

14. The apparatus as defined in claim 13, wherein said means for directing said reflected monochromatic radiation to said focusing means is an on-axis beamsplitter.

15. The apparatus as defined in claim 13, wherein said means for comparing said detected characteristics comprises:

means for digitizing an output signal of said charge coupled device camera; and means for comparing said digitized output signal with a set of digitized signals corresponding to said reference characteristics.

16. The apparatus as defined in claim 1, wherein said means for receiving said reflected monochromatic radiation and for detecting said characteristics comprises:

a charge coupled device camera for detecting said characteristics from said reflected monochromatic radiation;

means for collimating said reflected monochromatic radiation onto said charge coupled device camera; and means for directing said reflected monochromatic radiation to said collimating means.

17. The apparatus as defined in claim 16, wherein said means for directing said reflected monochromatic radiation to said collimating means is an off-axis mirror.

18. The apparatus as defined in claim 16, wherein said means for comparing comprises:

means for digitizing an output signal of said charge coupled device camera; and means for comparing said digitized output signal with a set of digitized signals corresponding to said reference characteristics.

19. The apparatus as defined in claim 1, wherein said means for comparing said detected characteristics of said received reflected monochromatic radiation comprises a calibration wafer having a layer of material formed on a front surface of said calibration wafer, wherein said layer of material has a plurality of different known thicknesses over said front surface, and wherein said plurality of different known thicknesses are measured and stored as said set of reference characteristics.

20. The apparatus as defined in claim 1, wherein the set of reference characteristics used in said means for comparing is computed based on predetermined thicknesses and assumed properties of said layer of material and said wafer.

\* \* \* \* \*